(12) United States Patent
Bean et al.

(10) Patent No.: US 6,955,863 B2
(45) Date of Patent: Oct. 18, 2005

(54) DUAL-PURPOSE COMPARTMENT FOR A HYBRID BATTERY AND FUEL CELL POWERED DEVICE

(75) Inventors: Heather N. Bean, Fort Collins, CO (US); Mark N. Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 419 days.

(21) Appl. No.: 10/280,883

(22) Filed: Oct. 25, 2002

(65) Prior Publication Data

US 2004/0081884 A1 Apr. 29, 2004

(51) Int. Cl.[7] ............ H01M 2/10; H01M 14/00; H01M 12/00

(52) U.S. Cl. ............ 429/96; 429/7; 429/8; 429/9; 429/99; 429/100

(58) Field of Search ............ 429/7, 8, 9, 96, 429/98, 99, 100

(56) References Cited

U.S. PATENT DOCUMENTS

| | | | |
|---|---|---|---|
| 5,641,585 A | 6/1997 | Lessing et al. | 429/26 |
| 5,759,712 A * | 6/1998 | Hockaday | 429/30 |
| 6,268,077 B1 | 7/2001 | Kelley et al. | 429/33 |
| 6,326,097 B1 | 12/2001 | Hockaday | 429/34 |
| 2004/0219398 A1 * | 11/2004 | Calhoon | 429/13 |
| 2005/0008903 A1 * | 1/2005 | Bourilkov et al. | 429/9 |

* cited by examiner

*Primary Examiner*—Patrick Joseph Ryan
*Assistant Examiner*—Thomas H. Parsons

(57) ABSTRACT

A compartment interchangeably holds either a battery or a fuel cartridge for powering a portable electronic device. The compartment includes electrical contacts to access energy stored in a battery. The compartment further includes a fuel port to access fuel stored in a fuel cartridge. Either of the battery or the fuel cartridge may be installed in the compartment. A portable electronic device, which is powered interchangeably by either a battery or a fuel cell, includes the compartment. A method of powering the portable electronic device includes installing either a battery or a fuel cartridge into a compartment that interchangeably holds the battery and the fuel cartridge, and powering the device using energy stored in the respectively installed battery or energy stored in fuel contained in the respectively installed fuel cartridge.

24 Claims, 6 Drawing Sheets

DUAL-PURPOSE COMPARTMENT FOR A HYBRID BATTERY AND FUEL CELL POWERED DEVICE

TECHNICAL FIELD

The invention relates to portable electronic devices and providing power to such portable electronic devices.

BACKGROUND OF THE INVENTION

Portable electronic devices, such as digital cameras for example, generally depend on a battery-based power supply for their operational power. In particular, a battery-based power supply that employs a user-replaceable battery is often used in such portable battery-powered devices. The battery may be either a non-rechargeable battery or a rechargeable battery. In either case, the battery of the battery-based power supply provides the device with operational power without requiring a continuous connection to a fixed power source, such as an alternating current (AC) electrical outlet, thus facilitating portable operation. Typically, the device can be operated from battery power until the battery becomes depleted. When depleted, the battery is either replaced with a fully charged, replacement or the battery is recharged if a rechargeable battery is being used.

Recent advancements in the area of fuel cells have sparked an interest in the use of fuel cells in place of batteries for powering portable electronic devices. Fuel cells, like batteries, directly convert chemical energy of a 'fuel' directly into electrical energy that may subsequently be utilized to power a portable device. However, unlike a battery in which the 'fuel' is in the form of electrodes in contact with an electrolyte that are more or less permanently enclosed inside the battery, the fuel cell utilizes a replenishable fuel supply to produce electrical energy from chemical energy.

In particular, the advent of so-called 'micro-fuel cells' has made it practical to use fuel cells in portable devices. Micro-fuel cells can be made lighter than conventional batteries. Furthermore, effective energy densities of between 1200 to 3000 W-hr per kg (20% to 50% efficiency) have been reported for fuel cells. Such energy densities give fuel cells around 2 to 5 times advantage over a typical energy density of 600 W-hr per kg for rechargeable lithium ion batteries. For example, Hockaday, U.S. Pat. No. 6,326,097 B1 discloses a micro-fuel cell for powering portable devices.

In most cases, a device is equipped with and powered exclusively by either a micro-fuel cell or a battery. In a device exclusively powered by a fuel cell, a user of the device is highly dependent upon being able to obtain a replacement fuel cartridge when the device depletes a currently installed cartridge. On the other hand, a user of a device powered exclusively by a battery is dependent on either obtaining a replacement battery or suspending portable device operations while recharging a rechargeable battery when the battery becomes depleted.

Accordingly, it would be advantageous to have a portable electronic device that could be interchangeably powered using either a battery or a fuel cell, as opposed to using either one exclusively or both jointly. Furthermore, it would be desirable if a user of such a device could readily switch between using the battery and using the fuel cell. Such interchangeable battery and fuel cell power sources would solve a long-standing need in the area of powering portable electronic devices.

SUMMARY OF THE INVENTION

The present invention interchangeably provides operational power for a hybrid battery and fuel cell powered device from either a battery or a fuel cell. In an aspect of the invention, a dual-purpose compartment of a portable electronic device is provided. The dual-purpose compartment interchangeably accepts either a battery or a fuel cartridge containing a fuel for a fuel cell. In particular, either a battery or a fuel cartridge may be interchangeably inserted into and contained by the dual-purpose compartment. Energy extracted respectively from either the battery or the fuel cartridge when installed in the dual-purpose compartment powers the portable electronic device. The compartment comprises means for electrically contacting the battery when the battery is installed in the compartment and means for extracting fuel from the fuel cartridge when the fuel cartridge is installed in the compartment.

In another aspect of the invention, a portable electronic device that comprises a dual-purpose compartment is provided. The dual-purpose compartment interchangeably accepts either a fuel cartridge for a fuel cell or a battery to power the device. In yet another aspect of the invention, a method of powering a portable electronic device is provided.

Advantageously, the present invention powers a portable electronic device with a power supply that may be interchangeably energized using energy stored in a battery or energy derived from the operation of a fuel cell. Such an interchangeable 'dual-source' powering of the device enables the user of the device to flexibly determine during device use whether to employ the battery or the fuel cell as a power source. In particular, the flexibility afforded by the present invention frees the user of the device from having to provide for a particular one of a fuel cell cartridge or a battery when a currently installed battery or fuel cartridge becomes depleted. Certain embodiments of the present invention have other advantages in addition to and in lieu of the advantages described hereinabove. These and other features and advantages of the invention are detailed below with reference to the following drawings.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

DETAILED DESCRIPTION OF THE INVENTION

The present invention interchangeably provides operational power for a portable electronic device from either a battery or a fuel cell, the portable electronic device having a fuel cell and a power supply. The power supply can accept energy from either a battery or the fuel cell. A user of the portable device may choose to install either a battery or a fuel cartridge for the fuel cell in the portable device according to the present invention. Once installed, the portable device receives operational power from energy stored in either the respectively installed battery or fuel of the respectively installed fuel cartridge. Moreover, changing from using battery power to fuel cell power or from fuel cell power to battery power may be accomplished readily and without resorting to or requiring equipment auxiliary to the portable device. The present invention is applicable to virtually any electronic device including, but not limited to, a digital camera, video camera, a laptop computer, a personal digital assistant (PDA), a pocket computer, a compact disk (CD) player, an MP3 player, a portable radio, portable electronic toys, and a cellular telephone.

Figure 1:
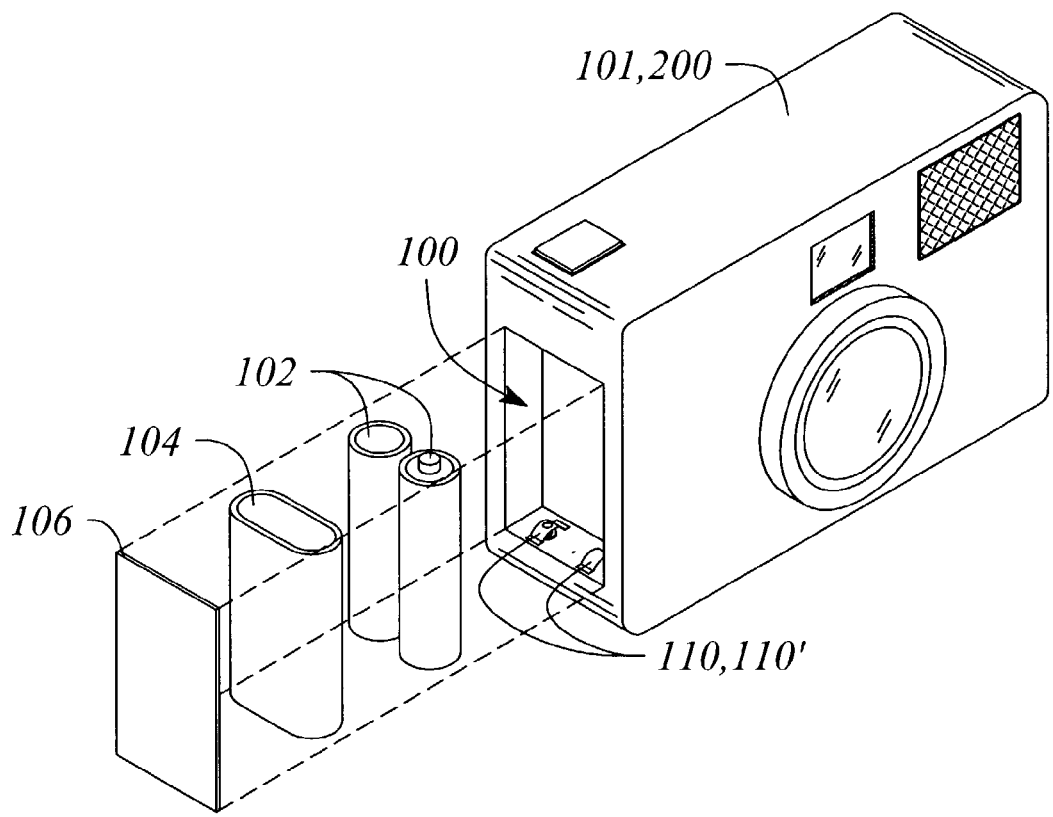
FIG. 1 illustrates a perspective view of an embodiment of a portable device having a dual-purpose compartment according to the present invention.

FIG. 1 illustrates a perspective view of an embodiment of a dual-purpose compartment 100 according to the present invention for a portable electronic device 101. The portable electronic device 101 illustrated in FIG. 1 is depicted as a digital camera 101 by way of example. The portable electronic device 101 can be any of the devices listed above, in addition to other devices known to one skilled in the art. The compartment 100 interchangeably accepts either a battery 102 or a fuel cartridge 104. A lid or compartment door 106 may cover the compartment 100 to protect and secure the battery 102 or fuel cartridge installed therein.

Figure 2:
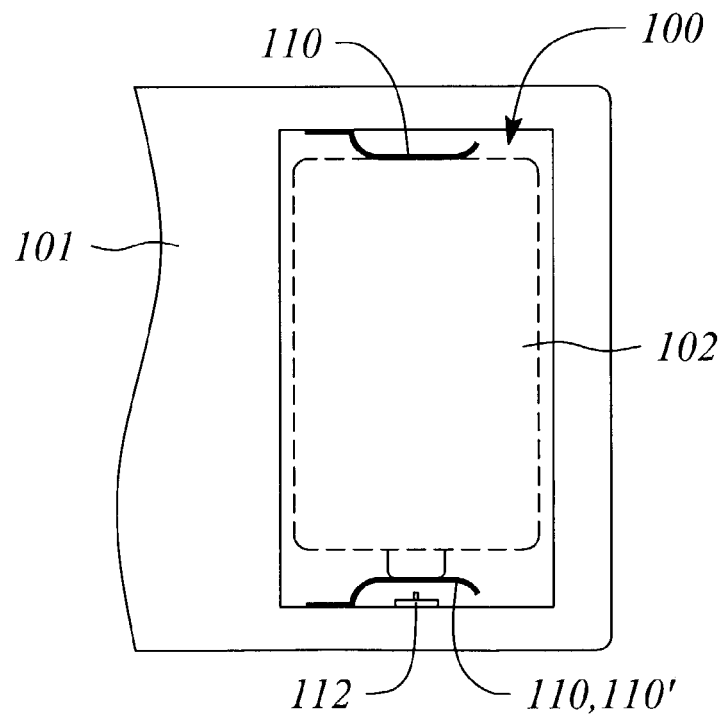
FIG. 2 illustrates an end view of an embodiment of a dual-purpose compartment showing a position of an installed battery.
Figure 3A:
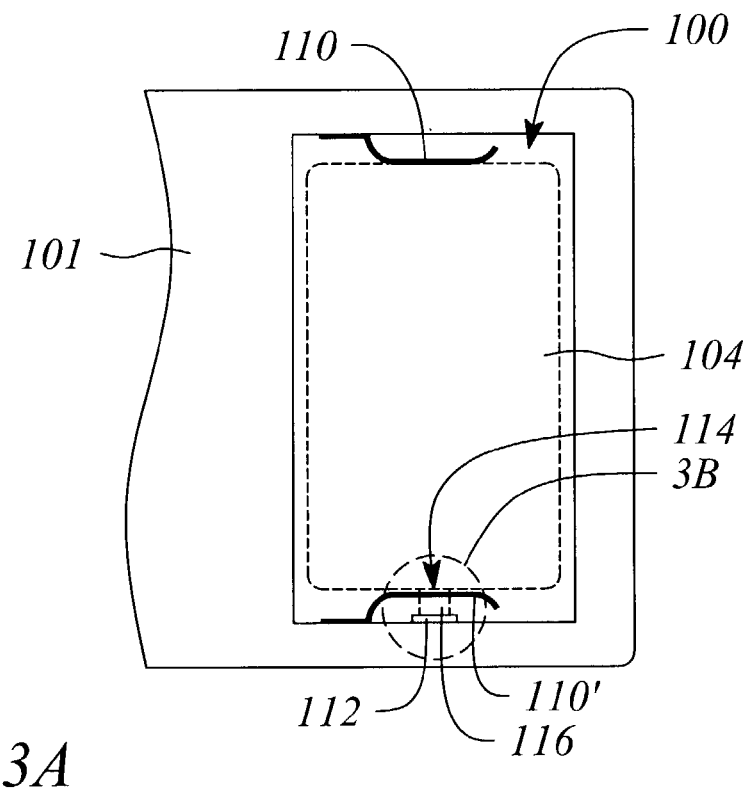
FIG. 3A illustrates an end view of the dual-purpose compartment illustrated in FIG. 2 showing a position of an installed fuel cartridge.

FIG. 2 illustrates an end view of an embodiment of the dual-purpose compartment 100 showing a position of an installed battery 102. FIG. 3A illustrates an end view of the dual-purpose compartment 100 illustrated in FIG. 2 showing a position of an installed exemplary fuel cartridge 104. Each of the battery 102 and the fuel cartridge 104 is illustrated as a dashed-line outline in FIGS. 2 and 3A, respectively. When the battery 102 is installed in the dual-purpose compartment 100, energy stored in the battery 102 is used to provide operational power to the portable electronic device 101. On the other hand, when the fuel cartridge 104 is interchangeably installed in the compartment 100, the fuel cell provides operational power to the portable device 101. In particular, fuel from the fuel cartridge 104 is consumed by the fuel cell that, in turn, generates power from energy stored in the fuel. The power thus generated powers the portable device 101.

The compartment 100 comprises means for electrically contacting the battery 102 and means for extracting fuel from the fuel cartridge 104. In particular, the compartment 100 comprises a plurality of electrical contacts 110 and a fuel port 112, respectively. The electrical contacts 110 electrically connect to terminals of the battery 102 when the battery 102 is installed in the compartment 100. Through the connection with terminals of the battery 102, the electrical contacts 110 enable energy stored in the battery 102 to be withdrawn as an electrical voltage and current. The energy flowing from the battery 102 by way of the electrical contacts 110 powers the portable device 101. Likewise, the fuel port 112 connects to the fuel cartridge 104 when the fuel cartridge 104 is installed in the compartment 100. Fuel flowing from the cartridge 104 is conducted through the fuel port 112 to the fuel cell. In the fuel cell, the fuel is converted into electrical energy in the form of an electrical voltage and current. The electrical energy produced by the fuel cell is used to power the portable device 101.

In some embodiments, the fuel port 112 is not co-located with the electrical contacts 110. In such embodiments, the electrical contacts 110 may be essentially conventional battery contacts. In particular, each of the electrical contacts 110 may comprise a relatively thin, resilient, conductive material such as, but not limited to, a metal alloy of beryllium (Be) and copper (Cu) formed in any one of a variety of 'spring-loaded' shapes known in the art. For example, the conductive material of the electrical contact 110 may be realized as a plate, band or strip, or a wire having a curved shape. The curved shape of the contact 110 is deformed by the presence of the battery 102 thereby providing a definite or certain contact with the terminal of the battery 102. In another example, the electrical contacts 110 may be a cantilever spring style contact known in the art.

In some embodiments, the conductive material of the contact 110 may be plated or coated with another conductive material to enhance conductivity and/or to protect the contact 110 from corrosion. For example, gold (Au) or nickel (Ni) may be used to plate the contact 110. Such electrical contacts 110 are often referred to as 'spring' contacts. Spring contacts are well known in the art, all shapes and sizes of which are within the scope of the present invention.

The fuel port 112 may be any conventional fuel port and may be located anywhere within the compartment 100. For example, the fuel port may be located on a back wall or a side wall of the compartment 100 relative to a compartment opening. Alternatively, the fuel port 112 may be located on an end of an extensible tube or hose. The fuel port 112 on the tube end enables the fuel cartridge 104 to be connected to the fuel port 112 prior to the fuel cartridge 104 being inserted into the dual-purpose compartment 100 through the compartment opening.

In other embodiments, the fuel port 112 is co-located with one or more of the electrical contacts 110. For example, the fuel port 112 may be adjacent to an electrical contact 110' on the same wall of the compartment. The fuel port 112 is adapted to accommodate the fuel cartridge 104. In such co-located embodiments, the electrical contact 110 has a conductive portion 113 and a fuel port aperture 114, which are described further below with respect to FIGS. 4A and 4B. The fuel port aperture 114 is a hole or a slot in the electrical contact 110 that facilitates interfacing the fuel cartridge 104 with the fuel port 112. The electrical contact 110' having a fuel port aperture 114 may be similar to the electrical contact 110 except that it is adapted to accommodate the fuel cartridge 104.

Referring again to FIGS. 1, 2, 3A, the compartment 100 is illustrated with the fuel port 112 being co-located with an electrical contact 110' of the plurality of electrical contacts 110'. Specifically, the fuel port 112 is illustrated as being adjacent to (e.g., below or behind) the contact 110' and on the same wall of the compartment 100 as the contact 110'. The fuel cartridge 104 comprises a nozzle 116 at one end.

Figure 3B:
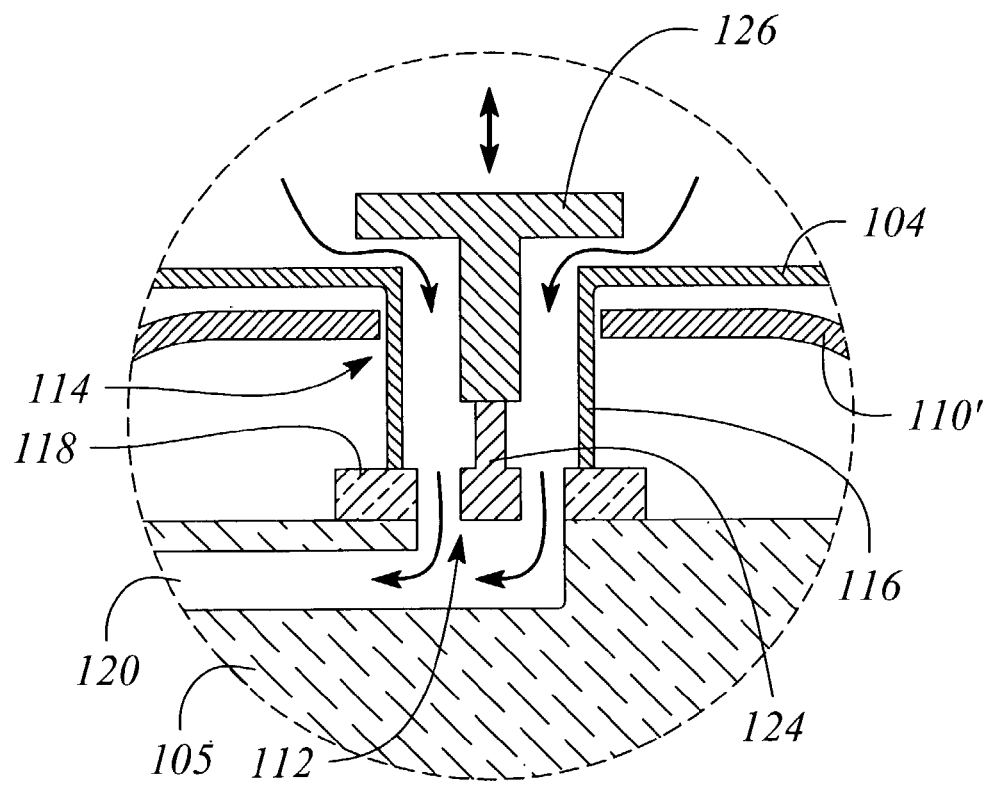
FIG. 3B illustrates a magnified cross sectional view of an embodiment of a contact enclosed within the dashed circle labeled 3B illustrated in FIG. 3A.

FIG. 3A further illustrates within the dashed circle labeled 3B that the nozzle 116 of the installed fuel cartridge 104 is received through the fuel port aperture 114 of the contact 110' to align with the fuel port 112 of the compartment 100. FIG. 3B illustrates a magnified cross sectional view of an embodiment of the contact 110' enclosed in the dashed circle labeled 3B illustrated in FIG. 3A. In particular, FIG. 3B illustrates an interface formed between the nozzle 116 of the installed fuel cartridge 104 and the fuel port 112 of the compartment 100. The nozzle 116 extends through the fuel port aperture 114 of the contact 110' and rests against a gasket 118 adjacent to or surrounding the fuel port 112. The interface at the gasket 118 reduces, minimizes or preferably prevents inadvertent leakage of fuel stored within the fuel cartridge 104, for example fuel leakage into the compartment 100. While interfaced, the fuel flows from the fuel cartridge 104 via the nozzle 116 through the fuel port 112 and into a fuel channel 120. The fuel flow is indicated by the thick, single-headed arrows illustrated in FIG. 3B. The fuel channel 120 may be a part or portion of the compartment 100 or may be part or portion of the portable electronic device 101, or a portion of both the compartment 100 and the device 101, depending on the embodiment. For example, the fuel channel 120 is illustrated in FIG. 3B as being embedded within a wall 105 of the compartment 100.

Figure 4A:
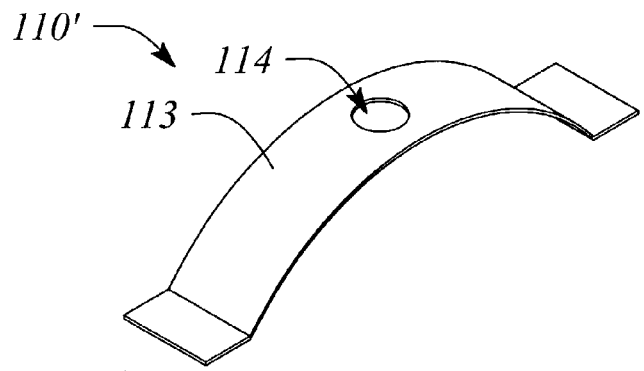
FIG. 4A illustrates a perspective view of an embodiment of an electrical contact having a fuel port aperture according to the present invention.
Figure 4B:
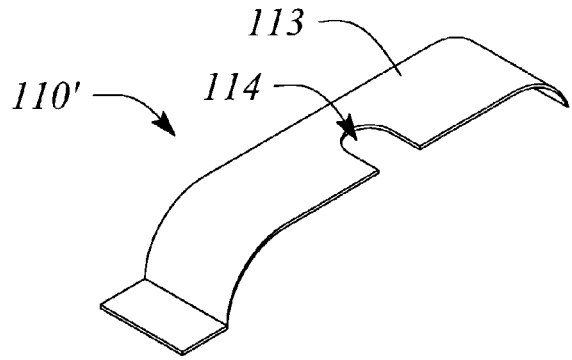
FIG. 4B illustrates a perspective view of another embodiment of an electrical contact having a fuel port aperture according to the present invention.

FIG. 4A illustrates a perspective view of an embodiment of an electrical contact 110' having a fuel port aperture 114 according to the present invention. The electrical contact 110' embodiment, as illustrated in FIG. 4A, comprises a conductive portion 113 made of a resilient, metal band that is formed to have a slight convex curvature, such as having a semi-circular shape. Once formed, the resilience of the metal band enables the contact 110' to act as a spring. The spring-like characteristic of the formed metal band helps to insure that a definite or certain mechanical and electrical contact is maintained with a terminal of the installed battery 102. The fuel port aperture 114 is illustrated in FIG. 4A as a hole formed in a middle of the band. FIG. 4B illustrates a perspective view of another embodiment of the electrical contact 110' wherein the fuel port aperture 114 is a slot in a side of the conductive portion 113. In addition, the metal band conductive portion 113 of the contact 110' illustrated in FIG. 4B has a flattened, semi-circular shape relative to the shape in FIG. 4A.

Figure 5A:
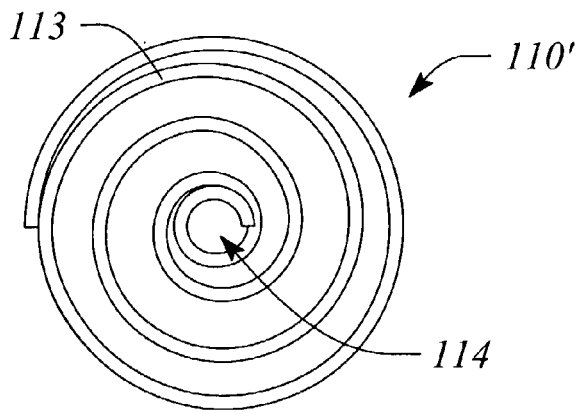
FIG. 5A illustrates an end or top view of another embodiment of an electrical contact having a fuel port aperture according to the present invention.
Figure 5B:
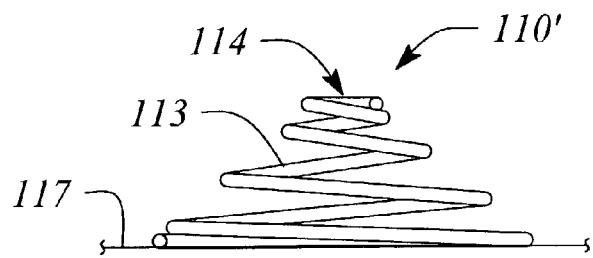
FIG. 5B illustrates a side view of the electrical contact embodiment illustrated in FIG. 5A.

FIG. 5A illustrates an end or top view and FIG. 5B illustrates a side view of another embodiment of the electrical contact 110' having a fuel port aperture 114 according to the present invention. As illustrated in FIGS. 5A and 5B, the electrical contact 110' comprises a conductive portion 113 that is a resilient, metal wire formed into the shape of a coiled spring. The coiled spring embodiment of the electrical contact 110' may be flat (not illustrated) or may extend away from a mounting surface 117 of the spring, as illustrated in FIG. 5B. The mounting surface 117 of the spring is mounted adjacent to a wall of the compartment 100. In the embodiment illustrated in FIGS. 5A and 5B, the fuel port aperture 114 is an approximately circular opening formed through the coiled spring from the mounting surface 117 end to an opposite end of the conductive portion 113. As with the contact 110' embodiment illustrated in FIGS. 4A and 4B, the contact 110' embodiment illustrated in FIGS. 5A and 5B has a spring-like tension characteristic that helps to insure a definite or certain mechanical and electrical contact with the terminal of the battery 102 installed in the compartment 100. Other contact types such as, but not limited to a cantilever spring contact (not illustrated), may be similarly adapted to have a fuel port aperture 114, thereby enabling these other contact types to be used in place of the electrical contact 110, 110' described above according to the present invention. Spring contacts are well known in the art, all shapes and sizes of which, when adapted to have a fuel port aperture 114, are within the scope of the present invention.

As mentioned above, when a fuel cartridge 104 is installed in the compartment 100, the fuel port aperture 114 of the contact 110' allows the nozzle 116 of the fuel cartridge 104 access to the fuel port 112, as illustrated by way of example in FIGS. 3A and 3B. Alternatively, the fuel port aperture 114 may allow a portion of the fuel port 112 to extend through the aperture 114 to contact the fuel cartridge 104 when the fuel cartridge 104 is installed in the compartment 100 (not illustrated). Thus, the presence of the fuel port aperture 114 in the electrical contact 110' accommodates a variety of possible interfaces between the fuel port 112 and the fuel cartridge 104 that are within the scope of the present invention.

The fuel port 112 and the fuel cartridge 104 are intended to interface in a manner that allows the fuel contained in the cartridge 104 to flow from the cartridge 104 to the fuel cell (not illustrated) through the fuel port 112. The mating interface between the fuel cartridge 104 and the fuel port 112 accommodates a type of fuel carried by the fuel cartridge 104. For example, a fuel cartridge 104 that contains liquefied or gaseous hydrogen fuel may have a different mating interface with the fuel port 112 than a fuel cartridge 104 that contains an alcohol-based fuel, such as methanol or ethanol. Therefore, either or both of the fuel port 112 and the fuel cartridge 104 provides the mating interface that is adapted to and accommodates a given fuel type. Preferably, the fuel port 112 provides a mating interface that is at least compatible with the fuel type used by the fuel cell of the electronic device 101, while the fuel cartridge 104 has a universal mating interface that accommodates any mating interface of the fuel port 112. However, a variety of fuel port 112 and fuel cartridge 104 mating configurations are possible that are or may become familiar to one skilled in the art. All such mating interface configurations of fuel port 112 and fuel cartridge 104 are within the scope of the present invention.

Figure 6:
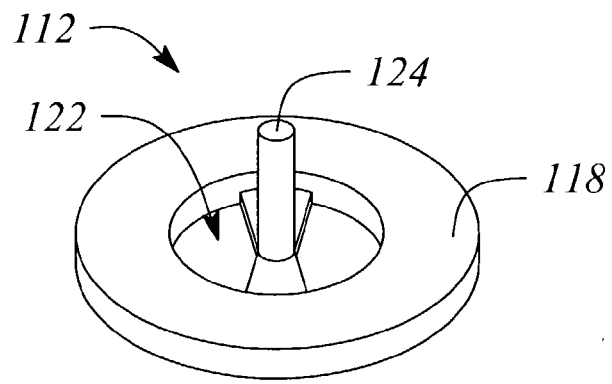
FIG. 6 illustrates a perspective view of an embodiment of a fuel port for use with a fuel cartridge having a pressure-activated valve according to the present invention.

For example, a fuel cartridge 104 embodiment that contains an alcohol-based fuel may utilize a pressure-activated valve similar to a schraeder valve (e.g., a bicycle tire valve) mounted in the nozzle 116. FIG. 6 illustrates a perspective view of an embodiment of a fuel port 112 for use with a fuel cartridge 104 having a pressure-activated valve according to the present invention. As illustrated in FIG. 6, the fuel port 112 comprises a gasket 118 around an opening 122. The opening 122 is adjacent to the channel 120 (illustrated in FIG. 3B) that carries the fuel from the fuel cartridge 104 via the fuel port 112 to the fuel cell. The fuel port 112 illustrated in FIG. 6 may further comprise a pin 124 fixed approximately in a center of the opening 122.

Referring again to FIG. 3B, the fuel port 112 illustrated in FIG. 6 is depicted interfaced to the fuel cartridge 104 having a pressure-activated valve 126. When the fuel cartridge 104 is inserted into the compartment 100, an outer perimeter of the nozzle 116 seats against the gasket 118 forming a seal. Simultaneously, the pin 124 of the fuel port 112 extends into the nozzle 116 contacting the pressure-activated valve 126. The pin 124 applies an upward pressure (illustrated as a double-headed arrow in FIG. 3B) to the valve 126 causing the valve 126 to open. The open valve 126 enables the fuel to flow from the cartridge 104 through the nozzle 116 and the fuel port 112 and into the fuel channel 120. Removal of the cartridge 104 from the compartment 100 releases the pressure-activated valve 126, thereby resealing the cartridge 104 and preventing inadvertent release of fuel.

If the fuel port 112 and the electrical contact 110' are co-located, the fuel port 112 and fuel port gasket 118 are located behind the electrical contact 110' with respect to the opening in the compartment 100 for receiving the cartridge 104, as mentioned previously. Moreover, the nozzle 116 of the fuel cartridge 104 is inserted through the fuel port aperture 114 of the electrical contact 110' to contact the gasket 118 as the cartridge 104 is inserted into the compartment 100. Advantageously, the spring-like action of the electrical contacts 110, 110' may assist in ensuring a definite or certain connection between the nozzle 116 of the fuel cartridge 104 and the gasket 118 of the fuel port 112. Additionally, the spring-like action of the electrical contacts 110, 110' may assist the pin 124 of the fuel port 112 in activating the pressure-activated valve 126 of the cartridge 104.

In another example, the fuel cartridge 104 may have a 'gasket-like' valve resembling a rubber gasket valve found in a basketball, a football or a soccer ball. The gasket-like valve may be in the nozzle 116 of the fuel cartridge 104. In this example, the fuel port 112 may comprise a hollow needle or pin that penetrates the rubber gasket-like valve of the cartridge 104. The fuel flows through the hollow needle when the needle is so inserted. When the needle is removed from the gasket-like valve, the valve reseals thereby preventing inadvertent release of fuel.

Figure 7:
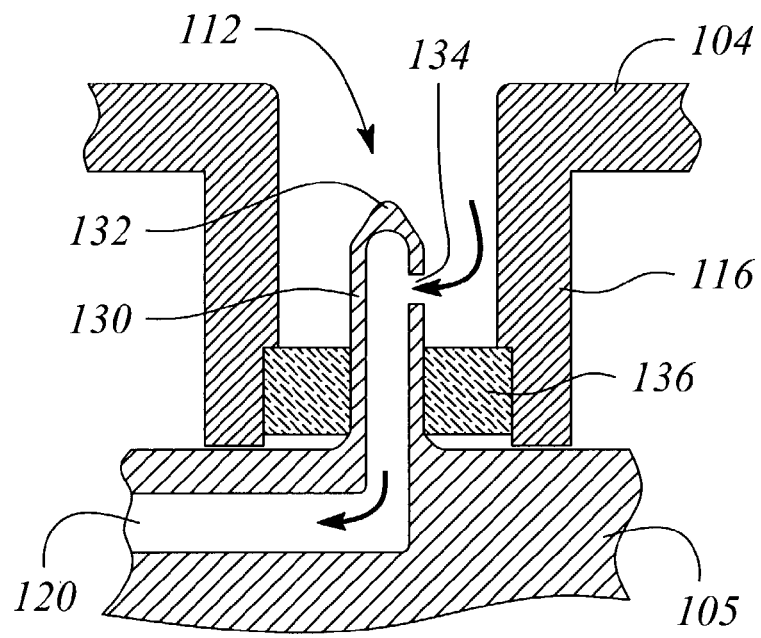
FIG. 7 illustrates a cross sectional view of another embodiment of a fuel port adapted for use with a gasket-like valve of a fuel cartridge according to the present invention.

FIG. 7 illustrates a cross sectional view of an embodiment of the fuel port 112 adapted for use with a gasket-like valve of the fuel cartridge 104. In particular, the gasket-like valve is in the nozzle 116 of the fuel cartridge 104. The fuel port 112 illustrated in FIG. 7 comprises a hollow needle 130 with a relatively blunt tip 132. An aperture 134 in a side of the needle allows fuel to flow into the hollow needle 130. The gasket-like valve 136 is penetrated by the needle 130, enabling the fuel to flow through the fuel port 112 and into the fuel channel 120, as indicated by thick, single-headed arrows illustrated in FIG. 7. The gasket-like valve 136 forms a seal with the inserted needle 130 during fuel transfer. Moreover, the fuel port 112 optionally further comprises a gasket, such as gasket 118 described above, to facilitate providing a seal between the nozzle 116 and the fuel port 112. The gasket-like valve 136 reseals itself when the cartridge 104 is removed from the compartment 100 such that inadvertent release of the fuel is prevented or at least reduced or minimized.

Figure 8:
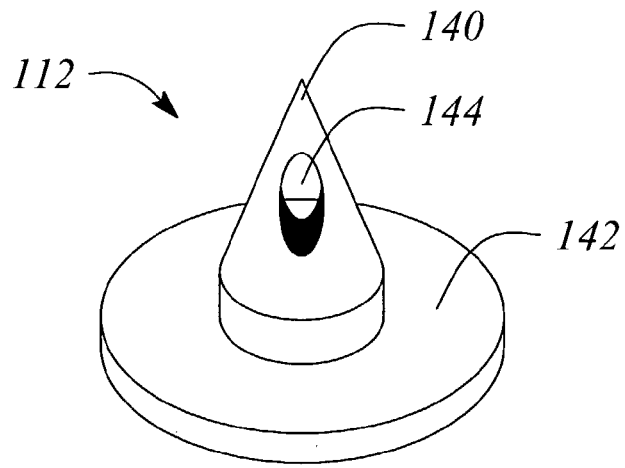
FIG. 8 illustrates a perspective view of another embodiment of a fuel port that employs a sharp hollow needle to pierce a membrane of a fuel cartridge according to the present invention.

In yet another example, the fuel port 112 comprises a sharp hollow pin or needle 140 surrounded by a gasket 142. FIG. 8 illustrates a perspective view of another embodiment of the fuel port 112 that employs the sharp hollow needle 140 to pierce a membrane of a fuel cartridge 104 according to the present invention. The embodiment of the fuel port 112 illustrated in FIG. 8 is adapted for use with a fuel cartridge 104 having a membrane seal that is pierced to access the fuel. When the cartridge 104 is inserted into the compartment 100, the pin 140 pierces the membrane of the cartridge 104 enabling the fuel to flow from the cartridge into the fuel port 112 through an aperture 144 in the pin 140. The gasket 142 seals against the nozzle 116 of the fuel cartridge 104 to prevent, or at least minimize or otherwise reduce, inadvertent release of fuel into the compartment 100 while the cartridge 104 is installed therein. However, it is within the scope of the present invention for the membrane to be resealable or nonresealable, depending on the embodiment. Therefore, some embodiments of the fuel cartridge 104 provide for control of inadvertent release of fuel when the cartridge 104 is removed from the compartment 100 by using a resealable membrane. However, other embodiments of the fuel cartridge 104 do not provide for such control and use a nonresealable membrane. In these other embodiments, the fuel cartridge 104 is preferably emptied before being removed from the compartment 100.

Figure 9:
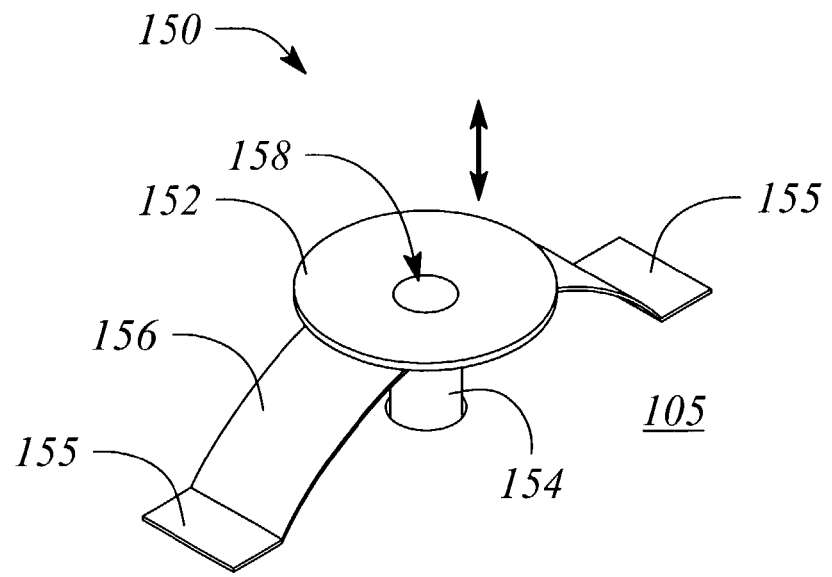
FIG. 9 illustrates a perspective view of an embodiment of a combined contact and fuel port assembly according to the present invention.

In other embodiments, a fuel port and an electrical contact are combined into a single assembly. FIG. 9 illustrates a perspective view of an embodiment of a combined electrical contact and fuel port assembly 150 according to the present invention. The combined assembly 150 illustrated in FIG. 9 comprises an electrical contact portion and a fuel port portion. The combined assembly 150 is interfaced with a wall 105 of the compartment 100. The electrical contact portion comprises an electrically conductive plate 152 mounted approximately at an apex of a semi-circular shaped, electrically conductive spring or resilient band 156. The electrical contact portion has a fuel port aperture 158 through the plate 152 that connects to the fuel port portion. The fuel port portion comprises a hollow tube 154 that extends from the fuel port aperture 158 into or through the wall 105 of the compartment 100 to interface with a fuel channel (not illustrated in FIG. 9). When a fuel cartridge 104 is installed in the compartment 100 having the combined assembly 150, the fuel channel carries the fuel from the fuel cartridge 104 inside the compartment 100 through the wall 105 of the compartment 100 to a fuel cell in the portable electronic device 101.

However, it is within the scope of the present invention for the fuel cell to be integrated into the compartment 100 instead of being in the portable electronic device. When the fuel cell is integral to the compartment 100, the fuel is carried by the fuel channel to the integral fuel cell. An electrical connection between the integral fuel cell and the electronic device allows energy from the integral fuel cell to be transferred to the electronic device.

The combined assembly 150 including the tube 154 of the fuel port portion can move up and down, as indicated by a double-headed arrow in FIG. 9, in response to a compression of the spring band 156. In some embodiments, opposite flange ends 155 of the spring band 156 are attached to the compartment wall 105 to maintain the interface between the combined assembly 150 and the compartment wall 105 against the tension of the spring band 156. The spring band 156, as was described hereinabove for embodiments of the contacts 110, 110' illustrated in FIGS. 4A, 4B, 5A and 5B, may assist in insuring a definite or certain connection between the electrical contact 152 and a terminal of an installed battery 102. In addition, the action of the spring band 156 may help to provide a sealed interface between the combined assembly 150 and the fuel cartridge 104 at the fuel port aperture 158.

Figure 10:
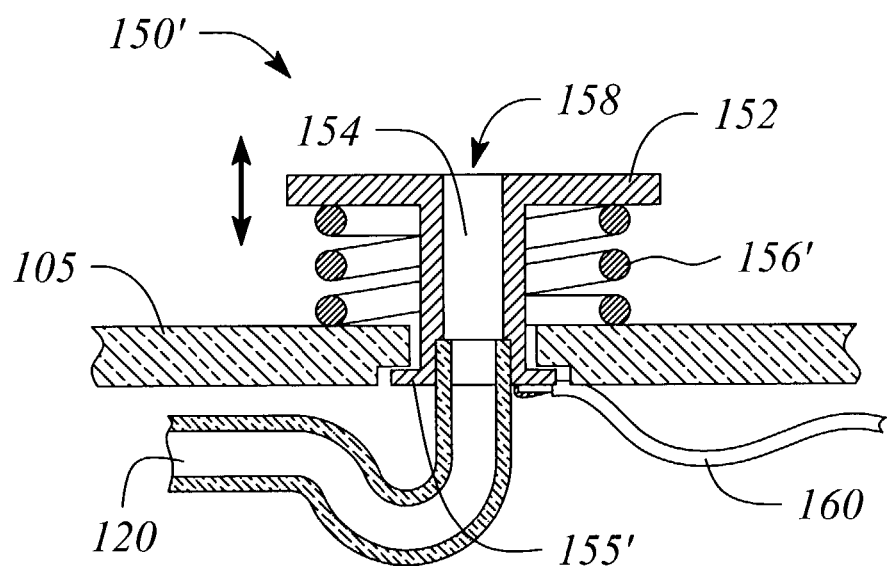
FIG. 10 illustrates a cross sectional view of another embodiment of a combined contact and fuel port assembly according to the present invention.

FIG. 10 illustrates a cross sectional view of another embodiment of a combined contact and fuel port assembly 150' according to the present invention. The combined assembly 150' according to this embodiment comprises the conductive plate 152, as described above with respect to the embodiment illustrated in FIG. 9, and a coil spring 156' instead of a metal band spring 156. The conductive plate 152 is mounted to an end of the spring 156'. The combined assembly 150' further comprises a fuel port tube 154 extending from a fuel aperture 158 of the plate 152 through the compartment wall 105 to the fuel channel 120 of the portable electronic device 101. The fuel port tube 154 movably extends through the wall 105 of the compartment 100, as indicated by a double-headed arrow in FIG. 10. The coil spring 156' illustrated in FIG. 10 is situated between the plate 152 of the electrical contact portion and the wall 105 of the compartment 100. The fuel port tube 154 extends through an approximate center of the coil spring 156' and through the compartment wall 105. In some embodiments, the fuel port tube 154 comprises a flange 155' at an end of the tube 154 that is opposite to the fuel port aperture 158. The flange 155' interfaces with the wall 105 of the compartment 100 to facilitate the connection between the combined assembly 150' and the compartment wall 105 against the tension of the coil spring 156'. One skilled in the art may readily devise a wide variety of spring configurations such as, but not limited to, a cantilever spring (not illustrated), in addition to the spring band 156 and the coil spring 156', for use in the present invention, all of which are within the scope of the present invention.

Further with respect to FIG. 10, an electrical wire 160 is connected to the combined assembly 150' to provide electrical connectivity between a battery installed in the compartment 100 and the power supply of the portable electronic device 101. Moreover, a flexible pipe or tube may be used as the fuel channel 120 to provide connectivity between a fuel cartridge 104 installed in the compartment 100 and the fuel cell of the portable electronic device 101. The flexibility of the fuel channel 120 facilitates movement of the combined assembly 150' during spring 156' compression. Additionally, a gasket (not illustrated) may be incorporated into the plate 152 of the electrical contact portion or the fuel cartridge 104 to assist in providing a sealed interface between the fuel cartridge 104 and the combined assembly 150'.

Figure 11:
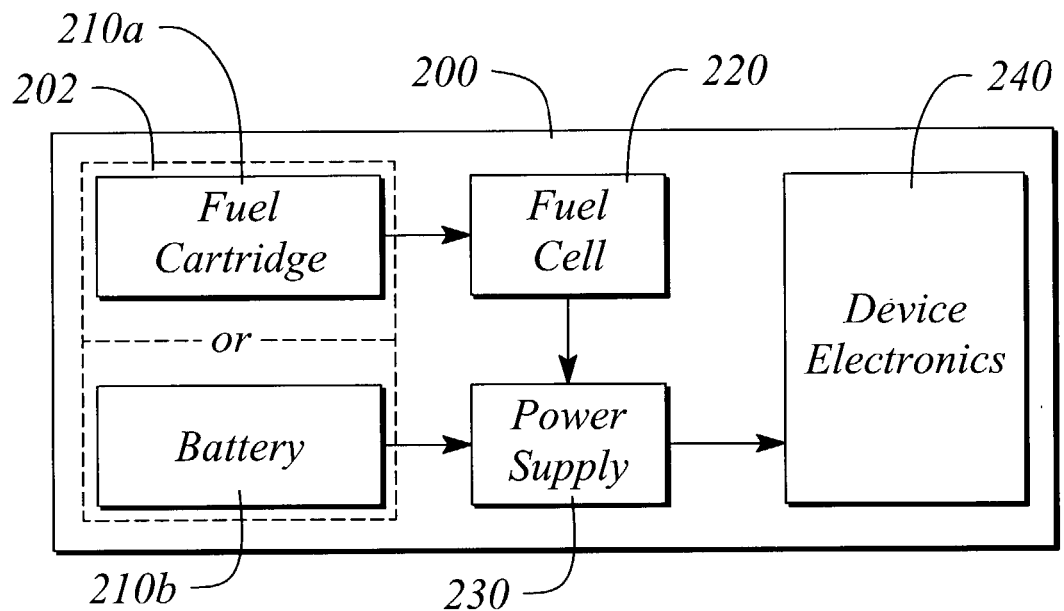
FIG. 11 illustrates a block diagram of an embodiment of a portable electronic device comprising a dual-purpose compartment according to the present invention.

FIG. 11 illustrates a block diagram of an embodiment of a portable electronic device 200 comprising a dual-purpose compartment according to the present invention. The portable electronic device 200 is interchangeably powered by a battery or fuel for a fuel cell. An exemplary embodiment of the portable electronic device 200, depicted as a digital camera 200, is illustrated in a perspective view in FIG. 1. The electronic device 200 comprises a compartment 202 into which either a fuel cartridge 210a or a battery 210b is replaceably and interchangeably installed. The compartment 202 may be any of the embodiments of the compartment 100 described hereinabove according to the present invention. In particular, the compartment 202 has both means for electrically contacting the battery 210b, such as electrical contacts for connecting to terminals of the battery 210b, and means for extracting fuel from the fuel cartridge 210a, such as a fuel port, as was described hereinabove for the embodiments of the electrical contacts 110, 110', of the fuel port 112, and of the combined assembly 150, 150'. Moreover, the fuel cartridge 210a may be any one of the embodiments of the fuel cartridge 104 described above.

The electronic device 200 further comprises a fuel cell 220, a power supply 230, and device electronics 240. The electrical contacts of the compartment 202 are connected to an input of the power supply 230. The fuel port of the compartment 202 is connected to an input of the fuel cell 220. An output of the fuel cell 220 is connected to another input of the power supply 230. An output of the power supply is connected to the device electronics 240.

The fuel cell 220 may be any electrochemical energy conversion apparatus that converts a fuel into electrical energy. In particular, the fuel cell 220 may be a polymer electrolyte membrane (PEM) fuel cell 220 that utilizes a solid, organic polymer as an electrolyte, such as polyperfluorosulfonic acid or a similar material. Similarly, the fuel may be any fuel that can be used by a fuel cell 220 to produce electrical energy including, but not limited to, hydrogen, methanol, ethanol, and compressed natural gas. Moreover, the fuel cell 220 may comprise a stack or array of fuel cell 220 connected in series. Representative examples of various fuel cells and the manufacture thereof, which are applicable to the present invention, are disclosed in U.S. Pat. Nos. 4,673,624; 5,364,711; 5,432,023; 5,631,099; 5,759,712; 6,268,077 and 6,326,097, all of which are incorporated herein by reference.

When the battery 210b is installed in the compartment 202, energy stored in the battery is transmitted as a voltage and a current to the power supply 230 by way of the electrical contacts of the compartment 202. The energy transmitted from the battery 210b is converted to a form suitable for powering the device electronics 240. For example, the power supply 230 may convert the voltage of the battery 210b into one or more voltages used by the electronics 240. Further, the power supply 230 may regulate the one or more voltages and/or one or more currents associated with the voltages.

When the fuel cartridge 210a is installed in the compartment 202, energy stored in fuel contained in the fuel cartridge 210a is consumed by the fuel cell 220. In particular, fuel is conducted through the fuel port of the compartment 202 and into the fuel cell 220. The fuel cell 220, in turn, produces a voltage and a current by consuming the fuel conducted thereto. The voltage and current are applied to the other input of the power supply 230. As was described hereinabove with respect to the battery-based operation, the power supply 230 converts the voltage and the current produced by the fuel cell 220 into one or more voltages and one or more currents suitable for powering the device electronics 240.

In some embodiments, the power supply 230 may be a single physical unit having several dedicated inputs, one dedicated input being connectable to the battery 210b and another being connectable to the fuel cell 220. In other embodiments, the power supply 230 may have only a single input switchably or changeably connectable to either the battery 210b or the fuel cell 220. In yet other embodiments, the power supply 230 may comprise two physical units, one dedicated to battery-based operation and another dedicated to fuel cell-based operation of the device 200. One skilled in the art is familiar with power supplies 230 used to power device electronics 240, and the numerous variations thereof, all of which are within the scope of the present invention.

In particular, the power supply 230 may be based on a DC-DC converter. Various DC-DC converters known in the art include, but are not limited to, linear regulators, switching regulators and converters, and charge pump converters.

For example, the power supply may employ a DC-DC converter, such as a MAX1674 High-Efficiency, Low-Supply-Current, Compact, Step-Up DC-DC Converter marketed by Maxim Integrated Products, Sunnyvale, Calif., USA. The power supply utilizing a step-up converter, such as the MAX1674, would be capable of handling a range of voltages that may be received from the fuel cell 220 or the battery 210b, for example. In some embodiments, the power supply 230 may differentiate between fuel cell-based operation and battery-based operation. In particular, the power supply 230 may switch between one of two operational modes based on whether the battery 210b or the fuel cartridge 210a is installed in the compartment 202. A determination of whether the fuel cartridge 210a or the battery 210b is installed may be accomplished by sensing a voltage from the fuel cell 220 or the battery 210b, respectively. Alternatively, determination may be based on mechanically sensing the installed fuel cartridge 210a or the battery 210b or by some other means, such as a user input to the electronic device 200. The electronic device 200 may further comprise fuel gauging to monitor a remaining fuel level in either the fuel cartridge 210a or battery 210b. Such fuel gauging may be incorporated into the power supply 230 and switched according to the installed fuel source. Which power supply 230 to use for a given electronic device 200 is dependent on the device 200 and the electronics 240 thereof. One skilled in the art can readily choose a power supply 230 without undue experimentation.

Figure 12:
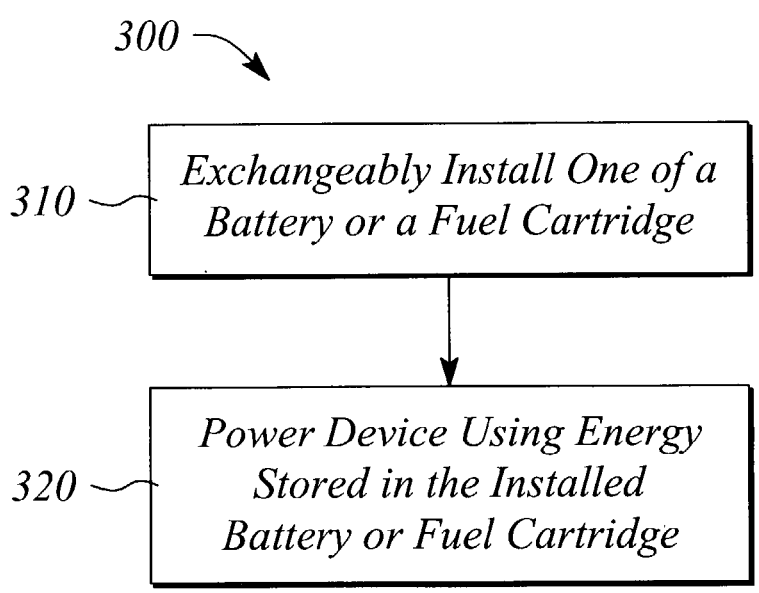
FIG. 12 illustrates a flow chart of a method of powering a portable electronic device using either a fuel cell-based or a battery-based power supply according to the present invention.

FIG. 12 illustrates a flow chart of a method 300 of powering a portable electronic device using either a fuel cell-based or a battery-based power supply according to the present invention. In particular, the method 300 is directed to electronic devices that are capable of receiving energy from either a battery or a fuel cartridge. Preferably, the electronic device comprises a compartment capable of replaceably and interchangeably containing either a battery or a fuel cartridge for a fuel cell. The method 300 comprises interchangeably installing 310 one of a battery or a fuel cartridge in the device. In some embodiments, the battery or the fuel cartridge is interchangeably installed in a compartment of the device. The method 300 further comprises powering 320 the device using energy stored in the installed battery or the installed fuel cartridge, respectively. The device is powered by converting the stored energy from either the installed battery or the installed fuel cartridge into an energy form useable by the device. The energy form is typically a voltage and a current, the levels of which are converted to useable levels that depend on the electronic device.

Thus, there have been described embodiments of a dual-purpose compartment and an electronic device having a dual-purpose compartment. Additionally, embodiments of a method of powering a device using either a fuel cell-based or battery-based power supply have been described. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A dual-purpose compartment of a portable electronic device that interchangeably holds either a battery or a fuel cartridge, the compartment comprising:
   means for electrically contacting the battery when the battery is installed in the compartment; and
   means for extracting fuel from the fuel cartridge when the fuel cartridge is installed in the compartment,
   wherein the portable device is powered by energy stored in either the battery or the fuel of the fuel cartridge while the battery or the fuel cartridge is interchangeably installed in the compartment.

2. The compartment of claim 1, wherein the portable device is one of a digital camera, video camera, a laptop computer, a personal digital assistant (PDA), a pocket computer, a compact disk (CD) player, an MP3 player, a portable radio, portable electronic toys, and a cellular telephone.

3. The compartment of claim 1, wherein the electrical contacting means and the fuel extracting means are each located in different portions of the compartment, the electrical contacting means comprising an electrical contact and the fuel extracting means comprising a fuel port.

4. The compartment of claim 1, wherein the electrical contacting means and the fuel extracting means are co-located within the compartment.

5. The compartment of claim 4, wherein the electrical contacting means comprises a plurality of electrical contacts, and wherein the fuel extracting means comprises a fuel port, the fuel port being adjacent to an electrical contact of the plurality.

6. The compartment of claim 5, wherein the electrical contact that is adjacent to the fuel port comprises an electrically conductive portion that has a fuel port aperture, wherein the fuel port is accessible via the fuel port aperture.

7. The compartment of claim 6, wherein the fuel port aperture is either a slot in an edge of the conductive portion or a hole extending through opposite surfaces of the conductive portion.

8. The compartment of claim 6, wherein the conductive portion comprises a band of a resilient material formed in a semi-circular or convex shape, the shape and the resilience of the band enabling the conductive portion to act as a spring.

9. The compartment of claim 6, wherein the conductive portion comprises a wire of a resilient material formed into a coiled spring, the fuel port aperture being at an open end of the coiled spring.

10. The compartment of claim 5, wherein the fuel port extends through a wall of the compartment and comprises:
    a gasket having an opening therethrough, the opening leading to a fuel channel of the portable device; and
    a pin attached to the gasket and suspended in the opening, the pin extending out from the gasket toward the adjacent electrical contact,
    wherein when the fuel cartridge is installed, a nozzle of the fuel cartridge makes contact with the gasket to form a seal and the pin extends into the nozzle to activate a pressure-activated valve within the nozzle, such that the activated valve allows fuel to flow from the fuel cartridge through the gasket opening and into the fuel channel.

11. The compartment of claim 5, wherein the fuel port extends through a wall of the compartment to interface with a fuel channel of the portable device, the fuel port comprising:
    a hollow needle having a blunt tip and an aperture adjacent to the blunt tip,
    wherein when the fuel cartridge is installed in the compartment, the hollow needle penetrates a gasket-like valve of the fuel cartridge, such that the aperture of the hollow needle allows fuel to flow from the fuel cartridge through the hollow needle and into the fuel channel of the portable device.

12. The compartment of claim 5, wherein the fuel port extends through a wall of the compartment to interface with a fuel channel of the portable device, the fuel port comprising:
- a hollow needle having a sharp tip and an aperture adjacent to the sharp tip; and
- a gasket at a base of the hollow needle, the base being opposite to the sharp tip,
- wherein when the fuel cartridge is installed in the compartment, a wall of the fuel cartridge makes contact with the gasket to form a seal and the sharp tip of the hollow needle pierces a membrane seal of the fuel cartridge, such that the aperture of the hollow needle allows fuel to flow from the fuel cartridge through the needle and into the fuel channel of the portable device.

13. The compartment of claim 4, wherein the electrical contacting means comprises a plurality of electrical contacts, and wherein the fuel extracting means comprises a fuel port, the fuel port being combined with an electrical contact of the plurality.

14. The compartment of claim 13, wherein the combined fuel port and electrical contact comprise:
- an electrically conductive plate mounted on a spring, the plate having a fuel port aperture; and
- a fuel port portion, wherein the fuel port aperture connects to the fuel port portion.

15. The compartment of claim 14, wherein the fuel port portion comprises a tube that extends through a wall of the compartment, the tube connecting the fuel port portion to a fuel channel of the portable device.

16. A portable electronic device comprising:
- a dual-purpose compartment, the compartment interchangeably accepting either a fuel cartridge for a fuel cell or a battery to power the device.

17. The device of claim 16, further comprising:
- a fuel cell;
- a power supply; and
- device electronics,
- wherein the power supply provides operational power to the device electronics interchangeably using energy stored in either the battery when installed in the dual-purpose compartment or fuel contained in the fuel cartridge when separately installed in the compartment, the energy stored in the fuel being extracted and supplied to the power supply by the fuel cell.

18. The device of claim 16, further comprising:
- a fuel cell;
- a fuel cell-based power supply;
- a battery-based power supply; and
- device electronics,
- wherein the device electronics receive operational power from the fuel cell-based power supply when a fuel cartridge is installed in the dual-purpose compartment, the fuel cell-based power supply receiving energy extracted by the fuel cell from fuel contained in the fuel cartridge, and
- wherein the device electronics receive operational power from the battery-based power supply when a battery is installed in the dual-purpose compartment, the battery-based power supply receiving energy from the battery.

19. A method of powering a portable electronic device comprising:
- installing either a battery or a fuel cartridge in a dual-purpose compartment of the device, the compartment interchangeably holding either the battery or the fuel cartridge; and
- powering the device using energy stored in the respectively installed battery or in fuel contained in the respectively installed fuel cartridge.

20. A dual-purpose compartment of a portable electronic device, the compartment comprising:
- a plurality of electrical contacts that contacts a battery when the battery is installed in the compartment; and
- a fuel port that extracts fuel from a fuel cartridge for use in a fuel cell of the portable electronic device when the fuel cartridge is installed in the compartment,
- wherein the compartment interchangeably holds either the battery or the fuel cartridge, the portable device being powered either by energy stored in the battery or by energy produced from the extracted fuel by the fuel cell while the respective battery or fuel cartridge is interchangeably installed in the compartment.

21. The compartment of claim 20, wherein an electrical contact of the plurality and the fuel port are either adjacent to one another or combined with one another.

22. The compartment of claim 20, wherein the fuel port is combined with an electrical contact of the plurality, the combined fuel port and electrical contact comprising:
- an electrically conductive plate mounted on a spring, the plate having a fuel port aperture; and
- a fuel port portion, wherein the fuel port aperture connects to the fuel port portion.

23. The compartment of claim 20, wherein the fuel port is adjacent to an electrical contact of the plurality, the adjacent fuel port and electrical contact comprising an electrically conductive portion that has a fuel port aperture, wherein the fuel port is accessible via the fuel port aperture.

24. The compartment of claim 23, wherein the fuel port aperture is either a slot in an edge of the conductive portion or a hole extending through opposite surfaces of the conductive portion.

* * * * *

UNITED STATES PATENT AND TRADEMARK OFFICE
CERTIFICATE OF CORRECTION

| | | |
|---|---|---|
| PATENT NO. | : 6,955,863 B2 | Page 1 of 1 |
| APPLICATION NO. | : 10/280883 | |
| DATED | : October 18, 2005 | |
| INVENTOR(S) | : Heather N. Bean et al. | |

It is certified that error appears in the above-identified patent and that said Letters Patent is hereby corrected as shown below:

IN THE SPECIFICATION

Column 5, line 3, delete "110" and insert therefor --110'--

Column 5, line 7, delete "110" and insert therefor --110'--

Signed and Sealed this

Twenty-sixth Day of June, 2007

JON W. DUDAS
*Director of the United States Patent and Trademark Office*